3,018,294
EPOXY ACETALS

Benjamin Phillips and Paul S. Starcher, Charleston, W. Va., assignors to Union Carbide Corporation, a corporation of New York
No Drawing. Filed June 17, 1959, Ser. No. 820,871
6 Claims. (Cl. 260—348)

This invention relates in general to a new class of organic compounds and more particularly to novel epoxy acetals and methods for their preparation.

This application is a continuation-in-part of application Serial No. 645,010, filed March 11, 1957, now abandoned, by B. Phillips and P. S. Starcher entitled "Mono-Epoxy Acetals" and assigned to the same assignee as the instant invention.

The novel epoxy acetals of the present invention can be conveniently represented by the following general formula:

$$R-CH \Big\langle {O-R \atop O-R}$$

wherein R is a member selected from the class consisting of monovalent aliphatic, alicyclic and aromatic groups and wherein at least one R contains the epoxy group

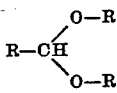

and at least one R contains an additional group which is a member selected from the class consisting of epoxy and olefinic groups. Preferred compounds represented by the aforesaid formula are those wherein R contains from 1 to 22 carbon atoms and more preferably from 3 to 18 carbon atoms in any one chain or group originating at the aldehydic carbon atom. When the R's which are attached to the etheric oxygen atoms contain epoxy groups they must contain at least 3 carbon atoms. Particularly preferred epoxy acetals are those compounds wherein R is alkyl, alkenyl, aryl, cycloalkyl, cycloalkenyl, cycloalkenylalkyl, bicycloalkenyl, bicycloalkenylalkyl, and wherein at least one double bond in the molecule has been converted to the epoxy group.

It should be noted that the novel acetal compounds of this invention are di-functional or poly-functional in that each compound contains at least two reactive groups, one of which must be an epoxy group. For example, the novel epoxy acetals encompassed by the first embodiment of the present invention are hereinafter described, contain one epoxy group and at least one unsaturated double bond. The other embodiments contain two or more epoxy groups and additionally can also contain olefinic unsaturation as well.

By the term "aliphatic," as hereinbefore employed, is meant a group composed of carbon, hydrogen, and in some instances oxygen and includes such groups as alkyl, alkenyl, alkoxy, epoxyalkyl, epoxyalkenyl, epoxyalkoxy, aralkyl, and the like. By the term "alicyclic" as employed throughout the specification and appended claims is meant a group composed of carbon, hydrogen, and in some instances, oxygen and includes such groups as cycloalkyl, bicycloalkyl, cycloalkenyl, bicycloalkenyl, epoxycycloalkyl, epoxybicycloalkyl, and the like.

By the term "epoxyalkyl" as employed throughout the specification and claims is meant an alkyl group to one pair of vicinal carbon atoms of which oxirane oxygen is attached.

Due to the presence of the epoxy group

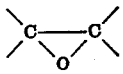

the novel compounds of this invention are useful in the preparation of epoxy resins. Particularly noteworthy, are the di- and tri-epoxy acetals which form excellent compositions when hardened with polyamines, polyacids, anhydrides, and the like. Additionally, the epoxy acetals which contain one or more double bonds are useful as monomers for copolymerization with vinyl compounds to give coatings and films which may be cross-linked through the epoxy group itself. These novel compounds are likewise of particular interest as precursors in the preparation of unsaturated glycols which are useful in the synthesis of vulcanizable polyurethanes. Thus, the unsaturated monoepoxy acetals such as the aldehyde alkenyl epoxyalkyl acetals are attractively useful in the manufacture of high purity alkanetriols such as glycerol, 1,9,10-octadecanetriol, 2-ethyl-1,2,3-hexanetriol, and the like. The alkanetriols thus formed are themselves useful solvents for a variety of organic chemicals, as hardeners for epoxy resins and as intermediates in the manufacture of a large variety of chemicals. The novel epoxy acetals of this invention are also valuable as stabilizers for chlorine-containing resins. For example, the novel compounds of this invention containing two epoxy groups have been found useful as plasticizers with vinyl halide resins. By incorporating into the resin from about 5 to about 50 percent by weight of these novel diepoxides, a plasticized product is obtained which possesses useful resilient and flexible characteristics. The vinyl halide resins which can be satisfactorily plasticized by the compounds of this invention can be any vinyl halide polymer such as polyvinyl chloride, vinyl chloride-vinyl acetate copolymers, vinyl chloride-acrylonitrile copolymers, vinyl chloride-vinylidene chloride copolymers, vinyl chloride-vinylidene chloride-acrylonitrile copolymers, and the like. The compounds of this invention may be used alone or in conjunction with conventional plasticizers.

A particularly interesting novel class of compounds included within the scope of the present invention embraces epoxy acetal compounds which contain a reactive double bond in the molecule as well as the epoxy group. These compounds are especially useful and differ from compounds lacking unsaturation in that they can be converted to polymers through either the oxirane ring or the polymerizable double bond and thereafter cross-linked through whichever of these two was not used in the initial polymerization. Many of the resulting polymeric materials are useful as lubricants and as hydraulic fluids where high temperatures are encountered. Thus, the epoxy acetals of this invention which contain a polymerizable bond are particularly useful since they can be incorporated into polymers through the polymerizable linkage and the epoxy group subsequently used for cross-linking the resin.

It is accordingly an object of the present invention to provide new organic compounds which are suitable for use in the plastic and resin field. Another object is to provide new compositions of matter comprising the epoxy acetals. A further object of the present invention is to provide novel compounds comprising the monoepoxy acetals. Another object is to provide novel acetals containing more than one epoxy group. A still further object of the present invention is to provide novel compounds having bifunctional properties in that they contain both epoxy groups and active double bonds within the same molecule. Another object of the present invention is to provide novel compounds containing epoxy groups which are part of a cycloaliphatic ring. A further object of the present invention is to provide novel compounds containing epoxy groups which are part of a bicycloaliphatic ring. A still further object is to provide processes for the preparation of the novel compositions of matter of this invention. These and other objects will readily become

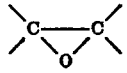

apparent to those skilled in the art in the light of the teachings herein set forth.

In its broad aspect, this inventon is directed to novel epoxy acetals of the aforementioned formula and methods for their preparation and encompasses novel difunctional epoxy acetals containing one or more epoxy groups. Thus, within the scope of the present invention are those compounds wherein R of the above formula can be alkyl, aryl, cycloalkyl, aralkyl, alkaryl, alkoxy, alkenyl, cycloalkenyl, cycloalkenylalkyl bicycloheptenyl, dihydrodicyclopentadienyl, and wherein at least one R contains an epoxy group. In the novel acetals containing only one epoxy group at least one double bond must be present in the molecule. For example, typical compounds illustrative of the novel epoxy acetals of the present invention include acetaldehyde allyl glycidyl acetal, acetaldehyde oleyl 9,10-epoxystearyl acetal, butyraldehyde allyl glycidyl acetal, acetaldehyde 2 - methyl - 2 - propenyl 2-methyl-2,3-epoxypropyl acetal, benzaldehyde allyl glycidyl acetal, 3,4-epoxy-6-methylcyclohexanecarboxaldehyde diallyl acetal, 3 - oxatricyclo[3.2.1.0$^{2,4}$]octane-6-carboxaldehyde diethyl acetal, benzaldehyde diglycidyl acetal, butyraldehyde di-(2,3 - epoxybutyl)acetal, 5,5 - di(6-methyl-3,4-epoxycyclohexylmethoxy)-1-pentene, bis(3,4-epoxy - 6 - methylcyclohexylmethyl) 3,4-epoxy-6-methylcyclohexanecarboxaldehyde acetal, bis(9,10-epoxystearyl) 3,4-epoxy-6-methylcyclohexanecarboxaldehyde acetal, 6-methyl-3-oxatricyclo[3.2.1.0$^{2,4}$]octane - 7 - carboxaldehyde di(1 - methyl - 3,4-epoxycyclohexylmethyl) acetal, 1,1,3 - tri(2,3 - epoxypropoxy)propane, 1,2-epoxy-5,5-di(6-methyl-3,4-epoxycyclohexylmethoxy)pentane, and the like.

One embodiment of the present invention encompasses those novel epoxy acetal compounds represented by the general formula:

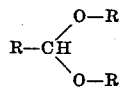

wherein R is as previously indicated and an epoxy group is present in only one of the R groups; the remaining two R's having at least one olefinc bond between them and being aliphatic, alicyclic, or aromatic groups or combinations thereof. The epoxy group can be present on any one of the R groups as part of a straight chain, branched chain, or part of a ring. Preferred compounds within the breadth of this embodiment would include among others the aldehyde alkenyl epoxyalkyl acetals, epoxyaldehyde dialkenyl acetals, epoxyaldehyde alkyl alkenyl acetals, epoxyaldehyde alkenyl aryl acetals, alkyl aldehyde alkenyl epoxyalkyl acetals, aryl aldehyde alkenyl epoxyalkyl acetals, and the like. Additionally, alkyloxy, alkaryl, aralkyl, cycloalkyl, cycloalkenyl, polycycloalkyl and polycycloalkenyl may be substituted for the alkyl, or aryl groups of the above compounds. It is thus evdent that the instant embodiment of the present invention embraces those compounds where an epoxy group is present in any one of the three R groups and at least one R contains an olefinic double bond. The remaining R groups can be aliphatic, alicyclic or aromatic groups or combinations thereof. While the monoepoxy acetals are the preferred compounds of this embodiment, acetals containing more than one epoxy group in the same R are intended to be included in the scope of this invention.

The aldehyde alkenyl epoxyalkyl acetals, referred to above as a preferred class within the above embodiment of the present invention, are also referred to as the unsaturated monoepoxy acetals, and can be represented by the class formula:

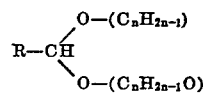

wherein R is a monovalent group and is a member selected from the class of aliphatic, alicyclic, and aromatic groups; —($C_nH_{2n-1}$) represents an alkenyl group; —($C_nH_{2n-1}$O) is an epoxy-alkyl group wherein O represents oxirane oxygen; and $n$ is an integer from 1 to 22 and preferably 3 to 18; with the limitation that $n$ have a value greater than 2 for the epoxy-containing group. Preferred aldehyde alkenyl epoxyalkyl acetals are those represented by the foregoing formula in which R contains from 1 to 18 carbon atoms, particularly 1 to 12 carbon atoms, since acetals having more than 18 carbon atoms in the R group, while being useful, are not economically feasible. Preferred aldehyde alkenyl epoxyalkyl acetals are those which can be represented by the foregoing formula in which R is alkyl or aryl. Thus, alkyl aldehyde alkenyl epoxyalkyl acetals and aryl aldehyde alkenyl epoxyalkyl acetals are preferred. Particularly preferred unsaturated monoepoxy acetals within this embodiment are those in which R is alkyl.

The unsaturated monoepoxy acetals can be prepared by the epoxidation of the olefinic double bonds of corresponding aldehyde dialkenyl acetals with suitable epoxidizing agents. The aldehyde dialkenyl acetal starting materials can be represented by the formula:

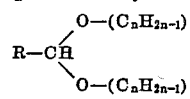

wherein R and $n$ are previously defined. Typical epoxidizing agents are the peracids, e.g., peracetic acid, perpropionic acid, perbenzoic acid, and the like, or the aldehyde monoperacylates, e.g., acetaldehyde monoperacetate and propionaldehyde monoperpropionate. Of these epoxidizing agents, the 2 to 3 carbon aliphatic peracids, particularly peracetic acid, and the 2 to 3 carbon aliphatic aldehyde mono- (2 to 3 carbon aliphatic)-peracylates, particularly acetaldehyde monoperacetate, are preferred mainly from the aspect of being economically available and capable of producing commercially acceptable yields. The epoxidation employing a peracid can be represented by the following equation:

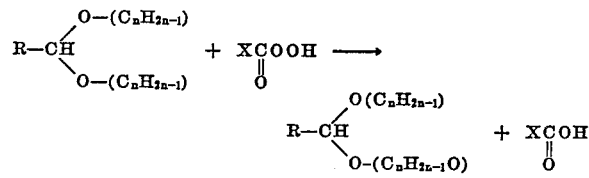

wherein R and $n$ are as previously defined,

represents a peracid and

represents the residue from the peracid after epoxidation. Epoxidations employing aldehyde monoperacylates can be represented similarly. Many epoxidizing agents in crystalline form or highly concentrated solutions are highly explosive when exposed to physical shocks, sometimes of the very slightest magnitude. Possible explosion hazards are avoided by preventing the formulation of crystalline forms or highly concentrated solutions of epoxidizing agent. This can be safely accomplished by employing in the epoxidation solutions containing below about 60 weight percent of epoxidizing agent. Ethyl acetate and acetone are two of the many solvents available for peracetic acid or acetaldehyde monoperacetate. It is particularly important that the epoxidation be carried out in the absence of heavy metal ions or strong acids and water so as to avoid the hydrolysis of the easily hydrolyzable acetal starting materials and products.

The epoxidation is advantageously carried out at temperatures in the range of 0 to 100° C. At temperatures below this range epoxidation takes place at a very slow rate and above this range side reactions produce undesired materials and reduce the yield. Molar ratios of epoxidizing agent to aldehyde dialkenyl acetal starting material can be varied over a wide range, for example, from 0.1 to 1.6, with molar ratios of 1.0 or below being preferred, however. Molar ratios above 1.6 may be employed, although the formation of other materials brought about by such higher ratios usually necessitates extensive separation methods. Molar ratios below 0.1 may also be employed, but the low yield of product makes the use of such ratios impractical. The epoxidation time required to produce our aldehyde alkenyl epoxyalkyl acetals will depend upon the epoxidation temperature, the molar ratios employed and the yield desired. Any suitable method for isolating the product, such as, fractionation, crystallization and the like can be employed.

A typical epoxidation which uses acetaldehyde diallyl acetal as starting material to produce the acetaldehyde allyl glycidyl acetal illustrates the method used to produce the several aldehyde alkenyl epoxyalkyl acetals of our invention. In this typical epoxidation, a 22.6 weight percent solution of peracetic acid in acetone was added continuously over a period of 3 hours to acetaldehyde diallyl acetal. The molar ratio of peracetic acid to the acetal was about 0.36 and the total weights of reactants were 304 grams of peracetic acid and 1577 grams of the acetal. The temperature of the reaction mixture during the addition of peracetic acid was maintained at about 50° C. and the reaction mixture was continually stirred during the entire addition. After adding all of the peracetic acid the reaction mixture was stirred for 4 additional hours while maintaining the temperature at about 50° C. At the end of this period, titration to determine peracetic acid content by conventional methods indicated that about 93.1 percent of the acid originally charged had been consumed. The reaction mixture was then cooled to room temperature.

The cooled reaction mixture was fed into ethylbenzene refluxing at reduced pressure and stripped of low-boiling materials, e.g., acetone, unreacted peracetic acid, and acetic acid (as an azeotrope with ethylbenzene), leaving a residue. The residue was then fractionated to provide 399 grams of acetaldehyde allyl glycidyl acetal. This amount of product represented a 68 percent yield based on theoretical. Acetaldehyde allyl glycidyl acetal, thus formed, had a boiling point of 91° C. to 95° C. at 20 millimeters of mercury reduced pressure and a sodium light index of refraction of 1.4322 at 30° C.

Similar epoxidations can be performed on other aldehyde dialkenyl acetals with, however, the replacement of acetaldehyde diallyl acetal, respectively, by benzaldehyde diallyl acetal, acetaldehyde dicrotyl acetal, acetaldehyde dioleyl acetal, butyraldehyde diallyl acetal, butyraldehyde dicrotyl acetal, propionaldehyde dioleyl acetal, acetaldehyde di(2-methyl-2-propenyl) acetal, phenylacetaldehyde diallyl acetal, phenylacetaldehyde dioleyl acetal, stearaldehyde diallyl acetal, acetaldehyde di(2-ethyl-2-hexenyl) acetal, and isobutyraldehyde diallyl acetal, to produce, respectively, benzaldehyde allyl glycidyl acetal, acetaldehyde crotyl 2,3-epoxybutyl acetal, acetaldehyde oleyl 9,10-epoxystearyl acetal, butyraldehyde allyl glycidyl acetal, butyraldehyde crotyl 2,3-epoxybutyl acetal, propionaldehyde oleyl 9,10-epoxystearyl acetal, acetaldehyde 2-methyl-2-propenyl 2-methyl-2,3-epoxypropyl acetal, phenylacetaldehyde allyl glycidyl acetal, phenylacetaldehyde oleyl 9,10-epoxystearyl acetal, stearaldehyde allyl glycidyl acetal, acetaldehyde 2-ethyl-2-hexenyl 2-ethyl-2,3-epoxyhexyl acetal, and isobutyraldehyde allyl glycidyl acetal. Molar ratios of peracetic acid to the respective aldehyde dialkenyl acetals, reaction temperatures and approximate reaction times of all of these epoxidations are essentially the same as the molar ratio, reaction temperature and reaction time of the acetaldehyde dialkenyl acetal epoxidation described above. Separations of the products are conducted by procedures which are similar to the separation procedures described above for isolating acetaldehyde allyl glycidyl acetal or by any other suitable separation methods and the percent yields are of the same approximate magnitude.

Aldehyde dialkenyl acetals which are starting materials in the production of the aldehyde alkenyl epoxyalkyl acetals of this embodiment of the present invention can be prepared by methods known in the art. A typical preparation of an aldehyde dialkenyl acetal is by the reaction of the corresponding alkenyl alcohol and the corresponding aldehyde in the presence of calcium chloride, as described by Hurd and Pollack, Journal of American Chemical Society, 60, 1906 (1938). Several other methods of preparing the starting materials are known.

A second embodiment of the present invention encompasses those novel compounds represented by the general formula:

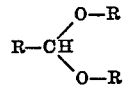

wherein R is as previously indicated and epoxy groups are present in two of the R groups and the remaining R is a saturated or unsaturated aliphatic, alicyclic or aromatic group. As indicated in the previous embodiment, the epoxy groups can be present as part of a straight chain, branched chain, or part of a ring. Preferred compounds within the breadth of this embodiment would include, among others, the alkyl aldehyde di-epoxyalkyl acetals, aryl aldehyde di-epoxyalkyl acetals, alkyl aldehyde di-epoxycycloalkyl acetals, alkyl aldehyde epoxycycloalkyl epoxyalkyl acetals, aryl aldehyde epoxycycloalkyl epoxyalkyl acetals, epoxyalkyl aldehyde epoxyalkyl alkyl acetals, epoxyalkyl aldehyde epoxyalkyl aryl acetals, epoxycycloalkyl aldehyde epoxyalkyl alkyl acetals, epoxycycloalkyl aldehyde epoxyalkyl aryl acetals, alkenyl aldehyde di-(epoxyalkyl) acetals, alkenyl aldehyde di-(epoxycycloalkyl) acetals, alkenyl aldehyde epoxycycloalkyl epoxyalkyl acetals, and the like. It should be noted that the instant invention is intended to embrace those compounds wherein the epoxy groups may be present in any two R groups and the remaining R group may be saturated or unsaturated. Thus, for example, compounds within this embodiment include the class of aldehyde di-(epoxyalkyl) acetals which can be prepared from the corresponding aldehyde dialkenyl acetal by the process of the instant invention. Benzaldehyde diallyl acetal, acetaldehyde dicrotyl acetal, acetaldehyde dioleyl acetal, butyraldehyde diallyl acetal, butyraldehyde dicrotyl acetal, propionaldehyde dioleyl acetal, acetaldehyde di(2-methyl-2-propenyl) acetal, phenylacetaldehyde diallyl acetal, phenylacetaldehyde dioleyl acetal, stearaldehyde diallyl acetal, acetaldehyde di(2-ethyl-2-hexenyl) acetal, and isobutyraldehyde diallyl acetal can be epoxidized to produce respectively, benzaldehyde diglycidyl acetal, acetaldehyde di(2,3-epoxybutyl) acetal, acetaldehyde di(9,10-epoxystearyl) acetal, butyraldehyde diglycidyl acetal, butyraldehyde di(2,3-epoxybutyl) acetal, propionaldehyde di(9,10-epoxystearyl) acetal, acetaldehyde di(2-methyl-2,3-epoxypropyl) acetal, phenylacetaldehyde diglycidyl acetal, phenylacetaldehyde di(9,10-epoxystearyl) acetal, stearaldehyde diglycidyl acetal, acetaldehyde di(2-ethyl-2,3-epoxyhexyl) acetal, and isobutyraldehyde diglycidyl acetal. While the diepoxy acetals are the preferred compounds within the scope of this embodiment, acetals containing more than one epoxy group in each of the two Rs are intended to be included in the breadth of this invention.

An additional preferred class of novel epoxy acetal compounds within the scope of the aforesaid second embodiment of the present invention would include those compounds represented by the following formula:

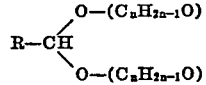

wherein R, $n$ and $-(C_nH_{2n-1}O)$ are as previously indicated.

The aldehyde dialkenyl acetals which are starting materials in the production of the aldehyde diepoxyalkyl acetals of this embodiment of the present invention can be prepared by methods known to the art. For example, butyraldehyde diallyl acetal is a known compound and was studied by Davison and Bater, J. Chem. Soc. 2607–11 (1953). The reaction of alkenyl alcohols and aldehydes in the presence of calcium chloride to give aldehyde dialkenyl acetals is described by Hurd and Pollack, J.A.C.S., 60, 1906 (1938). Several other methods for preparing the starting compounds are known.

A third embodiment of the present invention encompasses those novel compounds represented by the general formula:

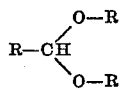

wherein R is as previously indicated and an epoxy group is present in each of the R groups. As indicated in the previous embodiments, the epoxy groups can be present as part of a straight chain, branched chain, or part of a ring.

A preferred class within this embodiment includes the novel tri-(epoxyalkyl) acetals having the formula:

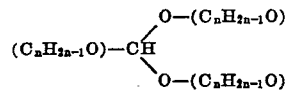

wherein —($C_nH_{2n-1}O$) represents an epoxyalkyl group wherein O represents oxirane oxygen and $n$ is an integer from 3 to 18.

Preferred compounds within the scope of this embodiment would include, among others, 1,1,3-tri-(2,3-epoxypropoxy) propane, 3,4-epoxy-6-methylcyclohexanecarboxaldehyde bis(9,10-epoxystearyl) acetal, 1,2-epoxy-5,5-di-(6-methyl-3,4-epoxycyclohexylmethoxy)pentane, 3,4-epoxy-6-methylcyclohexanecarboxaldehyde bis(3,4-epoxy-6-methylcyclohexylmethyl) acetal, 6-methyl-3-oxatricyclo[3.2.1.0$^{2,4}$]octane - 7 - carboxaldehyde di- (1 - methyl - 3,4-epoxycyclohexylmethyl) acetal, and the like. Additionally, compounds containing more than one epoxy group in each of the three R groups, are included within the scope of the instant invention.

In accordance with the process of this invention, the novel epoxy acetal compounds of the three aforementioned embodiments can be produced in high yields by the epoxidation of the olefinic linkage contained in the unsaturated acetal starting material. In the epoxy acetals prepared from compounds containing only one double bond, the epoxidation is effected quite easily. In the acetals prepared from unsaturated compounds having more than one site of unsaturation, it has been observed that epoxidation can occur selectively. Thus, by appropriate combinations of different olefinic groups an essentially complete selectivity can be achieved in the preparation of many epoxy acetals. Compounds which contain double bonds of approximately the same reactivity toward epoxidation can usually not be selectively epoxidized unless the epoxidizing agent is reacted with a large excess of diolefin.

In a preferred embodiment of the process of the present invention, the epoxidation of the unsaturated starting materials is carried out at temperatures in the range of from —25° C. to 150° C. At the lower temperatures, the rate of epoxidation is slow, while at the higher temperatures, the rate is faster necessitating precautions to prevent further reaction of the epoxide groups. In order to avoid undesired side reactions and to provide a suitable reaction rate, temperatures in the range of from 10° C. to 90° C. are preferable. In the practice of the invention, the unsaturated starting material is conveniently charged to a reaction vessel and the appropriate quantity of peracetic acid is added. The mole ratio is not necessarily critical and can be varied over a wide range depending on whether the mono-, di-, or higher epoxy compound is desired. The reaction is allowed to proceed for a time sufficient to consume approximately the theoretical quantity of peracetic acid needed to effect epoxidation. The amount of peracetic acid consumed can be determined by periodic tests for peracetic acid. Usually from about one to about ten hours is sufficient for the reaction to be completed at the preferred temperature. It is preferred, although not absolutely necessary, to separate the by-product acetic acid from the epoxide rapidly, since the acetic acid will react with the epoxide to form undesired products, decreasing the overall yield. Finally, the reaction mixture is subjected to conventional recovery procedures to isolate the epoxyester. Extraction with a suitable solvent, continuous distillation, or distillation under reduced pressures all are applicable to the recovery of the epoxidized compound.

The following examples illustrate the practice of this invention:

EXAMPLE I

*Preparation of 1,1,3-tri-(2,3-epoxypropoxy)-butane*

To 452 grams 1,1,3-trialloxybutane (from the reaction of crotonaldehyde with allyl alcohol) which was heated with stirring to 50° C.–55° C., there was added 1955 grams of a 27.2 percent solution of peracetic acid in ethyl acetate dropwise over a period of five hours. After an additional three hours the reaction was 91 percent complete as indicated by analysis for unreacted peracetic acid. The cooled reaction mixture was passed through a steam-heated stripper once at a pressure of 50 millimeters of mercury and again at 5 millimeters pressure to remove the volatiles from the product. The stripped product was then flash-distilled to give an almost colorless liquid, which upon analysis gave 80 percent as 1,1,3-tri-(2,3-epoxypropoxy) butane by the pyridine hydrochloride method, in 63 percent yield based on peracetic acid. A sample of this product was redistilled through a short Vigreaux column to give colorless material, 87.5 percent as 1,1,3-tri-(2,3-epoxypropoxy) butane, boiling point 154°/0.6 millimeter, $n$ 30/D 1.4593.

EXAMPLE II

*Preparation of 1,1,3-tri-(2,3-epoxypropoxy)propane*

To 424 grams of 1,1,3-triallyloxypropane, prepared from allyl alcohol and acrolein by the method outlined in U.S. Patent 2,561,254, which was maintained with stirring at 55° C.–60° C., there was added 1980 grams of a 26.9 percent solution of peracetic acid in ethyl acetate dropwise over a period of five hours. After an additional two hours at 60° C., the reaction was 96.7 percent complete as indicated by titration for unreacted peracetic acid. The reaction mixture was passed through a steam-heated stripper once at a pressure of 50 millimeters of mercury and again at 7 millimeters to remove the volatiles from the product. The stripped product was then flash distilled to give 285 grams of 1,1,3-tri-(2,3-epoxypropoxy)propane which contained 10.55 percent oxirane oxygen as determined by the pyridine hydrochloride method.

EXAMPLE III

*Preparation of 6-methyl-3-cyclohexenecarboxaldehyde diallyl acetal*

A mixture of 671 grams (5 mols) of 6-methyl-3-cyclo-hexenylcarboxaldehyde, 870 grams (15 mols) of allyl alcohol, 500 grams of benzene, and 7.5 grams of para-toluenesulfonic acid was charged to the kettle of a still equipped with a fractionation column. The reaction mixture was heated under a reflux at atmospheric pressure for a period of 22 hours, during which time 111 cubic centimeters of lower layer (constant boiling mixture of allyl alcohol, benzene, and water) separated in the still head. The catalyst was neutralized with sodium ethoxide, and the reaction mixture was distilled under pressure. There was obtained 653 grams (59 percent yield) of 6-methyl-3-cyclohexenecarboxaldehyde diallyl acetal having the following properties: boiling point, 113° C. at 5 millimeters pressure; refractive index 1.4698 ($n$ 30/D), density at 27° C., 0.9375. *Analysis.*—Calculated for $C_{14}H_{22}O_2$: C, 75.67; H, 9.97. Found: C, 75.47; H, 9.87. The infrared spectrum was consistent with the assigned structure.

EXAMPLE IV

*Preparation of 3,4-epoxy-6-methylcyclohexanecarboxaldehyde diallyl acetal*

To 389 grams (1.726 mols) of 6-methyl-3-cyclohexenecarboxaldehyde diallyl acetal was added dropwise, over a period of 95 minutes, 510 grams of a 28.3 percent solution of peracetic acid (1.9 mols) in ethyl acetate at a temperature of 30° C. After an additional 1.5 hour reaction period 96 percent of the theoretical amount of peracetic acid (for the monoxide) had been consumed. The reaction mixture was then fed dropwise to the kettle of a still containing 500 grams of ethylbenzene which was heated under reflux at such a pressure as to maintain a kettle temperature of 50° C. Ethyl acetate, acetic acid, and excess peracetic acid were removed continuously. The product was purified by fractional distillation to obtain 273 grams of 3,4-epoxy-6-methylcyclohexanecarboxaldehyde diallyl acetal, a colorless liquid having the following properties: boiling point, 126° C. at 2 millimeters; $n$ 30/D=1.4730; purity by the pyridine hydrochloride method of analysis, 99.1 percent. *Analysis.*—Calculated for $C_{14}H_{22}O_3$: C, 70.56; H, 9.29. Found: C, 70.55; H, 9.14.

EXAMPLE V

*Preparation of 6-methyl-3-cyclohexenecarboxaldehyde bis(6-methyl-3-cyclohexenylmethyl) acetal*

A mixture of 373 grams (3 mols) of 6-methyl-3-cyclohexenecarboxaldehyde, 1010 grams (8 mols) of 6-methyl-3-cyclo-hexenylmethanol, 1000 cubic centimeters of toluene, and 6.9 grams of p-toluenesulfonic acid was charged to a still equipped with a fractionating column and a decanter-type still head. The mixture was heated under reflux and the water removed continuously as it was formed. After 8 hours, 53 cubic centimeters of water had been removed. The catalyst was neutralized by adding 3.3 grams of sodium acetate and 25 cubic centimeters of 95 percent ethanol in which 1 gram of sodium had been dissolved. The reaction mixture was flash-distilled through a one-plate column and then fractionated in a second distillation. There was obtained 858 grams of 6-methyl-3-cyclohexenecarboxaldehyde bis(6-methyl-3-cyclohexenylmethyl) acetal, a colorless liquid having the following properties: boiling point 210° C. at 3 millimeters; $n$ 30/D=1.5010; D 25.5=0.9819. *Analysis.*—Calculated for $C_{24}H_{38}O_2$: C, 80.36; H, 10.78. Found: C, 80.45; H, 10.85. The infrared spectrum was consistent with the proposed structure.

EXAMPLE VI

*Preparation of 3,4-epoxy-6-methylcyclohexanecarboxaldehyde bis(3,4-epoxy-6-methylcyclohexylmethyl) acetal*

To a solution of 200 grams (0.559 mol) of 6-methyl-3-cyclohexenecarboxaldehyde bis(6-methyl-3-cyclohexenylmethyl) acetal in 100 grams of ethylbenzene was added 555 grams of a 28.8 percent solution of peracetic acid (2.1 mols) in ethyl acetate over a period of 30 minutes at a temperature of 40° C. After an additional reaction period of 1.67 hours at 40° C., the theoretical amount of peracetic acid had been consumed. An additional 500 grams of ethylbenzene was used to help remove the acetic acid and other volatiles from the product by co-distillation. After stripping to a kettle temperature of 80° C. at 8 millimeters pressure, there was obtained 291 grams of a residue product which had the following properties: viscous pale yellow liquid, analysis of pyridine-hydrochloride method for epoxide=87.4 percent calculated as 3,4-epoxy-6-methylcyclohexanecarboxaldehyde bis(3,4-epoxy-6-methylcyclohexylmethyl) acetal, iodine number=2.3, acidity calculated as acetic acid= 0.2 percent.

EXAMPLE VII

*Preparation of 6-methyl-3-oxatricyclo[3.2.1.0$^{2,4}$]octane-7-carboxaldehyde di(1-methyl-3,4-epoxyclcohexylmethyl) acetal*

A. *3-methylbicyclo[2.2.1]-5-heptene-2-carboxaldehyde di(1-methyl-3-cyclohexenylmethyl) acetal.*—A weight of 136 grams (1 mol) of refined 3-methylbicyclo[2.2.1]-5-heptene-2-carboxaldehyde was mixed with 315 grams (2.5 moles) of 1-methyl-3-cyclohexenylmethanol and refluxed in the presence of 500 milliliters of ethylene dichloride and 4 grams of p-toluenesulfonic acid. When 18 grams of water had been removed by distillation, the reaction mixture was neutralized and filtered over anhydrous sodium sulfate. Subsequent distillation gave 193 grams (52 percent of the theoretical yield) of 3-methylbicyclo[2.2.1]-5-heptene-2-carboxaldehyde di(1-methyl-3-cyclohexenylmethyl) acetal at a boiling point of 96–100° C. at 0.1 millimeter ($n$ 30/D=1.4861–1.5003). Analysis by iodine value determinations gave a value of 206 compared to a theoretical of 205.6.

B. *6-methyl-3-oxatricyclo[3.2.1.0$^{2,4}$]octane-7-carboxaldehyde di(1-methyl-3,4-epoxycyclohexylmethyl) acetal.*—A weight of 83 grams (0.224 mole) of 3-methylbicyclo-[2.2.1]-5-heptene-2-carboxaldehyde di(1-methyl-3-cyclohexenylmethyl) acetal was allowed to react with 206 grams (0.751 mole) of a 27.7 percent of peracetic acid in ethyl acetate at 25° C. to 30° C. for a 45-minute period. The consumption of peracid by the olefin was complete at that time. Conventional azeotropic removal (ethylbenzene) of the volatile components of the reaction mixture provided a non-distillable residue product which analyzed 47.5 percent as the expected triepoxide, 6-methyl-3-oxatricyclo[3.2.1.0$^{2,4}$]octane-7 - carboxaldehyde di(1-methyl-3,4-epoxycyclohexylmethyl) acetal.

EXAMPLE VIII

*Preparation of 5,5-di(6-methyl-3,4-epoxycyclohexylmethoxy)-1-pentene*

A. *5,5-di(6-methyl-3-cyclohexenylmethoxy)-1-pentene.* —A mixture of 96 grams (1.38 mole) of 4-pentenal, 428 grams of 6-methyl-3-cyclohexenylmethanol, 500 milliliters of ethylene dichloride and 3 grams of p-toluenesulfonic acid was refluxed at atmospheric pressure until no more water was observed at the still head attached to the reaction vessel (a period of approximately three hours). After neutralization of the catalyst, distillation of the reaction mixture gave 158 grams (36 percent of the theoretical yield) of 5,5-di(6-methyl-3-cyclohexenylmethoxy)-1-pentene at a boiling point of 142° C.–145° C. at 0.6 millimeter ($n$ 30/D=1.4828–1.4848; $I_2$ value= 243; theory $I_2$ value=239).

B. *5,5-di(6 - methyl - 3,4 - epoxycyclohexylmethoxy)-1-pentene.*—A weight of 74.5 grams (0.234 mole) of 5,5-di-(6-methyl-3-cyclohexenylmethoxy)-1-pentene was allowed to react with 165 grams (0.6 mole) of a 27.7 percent solution of peracetic acid in ethyl acetate over a two hour and 15 minute period at 40° C. After that period, analysis showed that two moles of peracid per mole of olefin used had been consumed. The volatile components of the reaction mixture were rapidly removed by vacuum evaporation to provide 82 grams of a residue product (quantitative yield) which analyzed 96.6 percent pure as 5,5-di(6-methyl-3,4-epoxycyclohexylmethoxy) - 1-pentene ($n$ 30/D=1.4862).

Infrared absorption studies showed that no unsaturation remained in the cyclic six-membered rings while the terminal unsaturation remained.

EXAMPLE IX

*Preparation of 1,2-epoxy-5,5-di-(6-methyl-3,4-epoxycyclohexylmethoxy)pentane*

A weight of 70 grams (0.22 mole) of 5,5-di(6-methyl-3-cyclohexenylmethoxy)-1-pentene was allowed to react at 55° C. with 219 grams (0.80 mole) of a 27.7 percent solution of peracetic acid in ethyl acetate for a period of three and one half hours. At that time, analysis showed 98 percent of the available peracid equivalent to the olefin employed had been consumed. The coproduct acetic acid was then removed as an azeotrope with ethylbenzene. Removal of the excess ethylbenzene gave a residue product which by analysis contained 74.8 percent of the expected triepoxide. Subsequent reduced-pressure distillation gave 49 grams (60.8 percent of the theoretical yield of 1,2-epoxy-5,5-di(6-methyl-3,4-epoxy-cyclohexylmethoxy)pentane, boiling point—202° C.–205° C. at 0.1 millimeter; $n\ 30/D = 1.4888-1.4891$; purity by pyridine hydrochloride method=98.7 percent.

Although the invention has been illustrated by the preceding examples, the invention is not to be construed as limited to the materials employed in the above examples, but rather, the invention encompasses the generic invention as hereinbefore disclosed. Various modifications and embodiments of this invention can be made without departing from the spirit and scope thereof.

We claim:
1. An epoxy acetal of the formula:

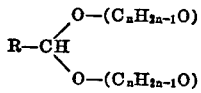

wherein R contains from 1 to 22 carbon atoms and is a member selected from the class consisting of alkyl, alkenyl, cycloalkyl, carbocyclic aryl, and epoxyalkyl; $-(C_nH_{2n-1}O)$ represents an epoxyalkyl group wherein O is oxirane oxygen; and $n$ is an integer from 3 to 18.

2. Alkyl aldehyde di(epoxyalkyl) acetal wherein the alkyl moiety contains up to 22 carbon atoms and the epoxyalkyl moieties contain from 3 to 18 carbon atoms.

3. Alkenyl aldehyde di(epoxyalkyl) acetal wherein the alkenyl moiety contains up to 22 carbon atoms and the epoxyalkyl moieties contain from 3 to 18 carbon atoms.

4. Carbocyclic aryl aldehyde di(epoxyalkyl) acetal wherein the carbocyclic aryl moiety contains up to 22 carbon atoms and the epoxyalkyl moieties contain from 3 to 18 carbon atoms.

5. Epoxyalkyl aldehyde di(epoxyalkyl) acetal wherein the epoxyalkyl moieties contain from 3 to 18 carbon atoms.

6. Acetalaldehyde diglycidyl acetal.

No references cited.